| COAT FACEPLATE WITH LAYER OF PHOTOSENSITIZED POLYVINYL ALCOHOL (PVA). | 10 |

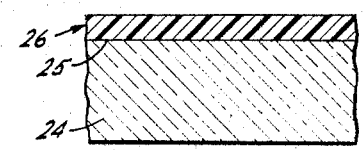

FIG. 2A.

| EXPOSE SELECTED REGIONS OF PVA LAYER. | 12 |

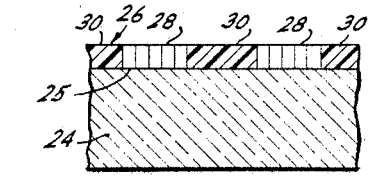

FIG. 2B.

| WASH THE PVA LAYER WITH WATER SUFFICIENTLY TO REMOVE THE UNEXPOSED REGIONS AND SOAK SAID SELECTED, EXPOSED REGIONS OF SAID PVA LAYER. | 14 |

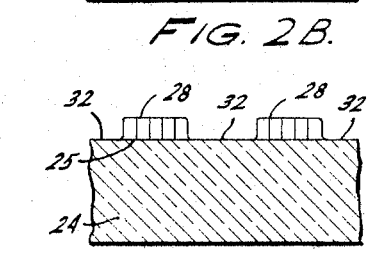

FIG. 2C.

| PROJECT DRY PHOSPHOR POWDER AGAINST SAID SOAKED, SELECTED REGIONS AT VELOCITIES SUFFICIENTLY HIGH TO EMBED SAID POWDER THROUGHOUT SAID REGIONS. | 16 |

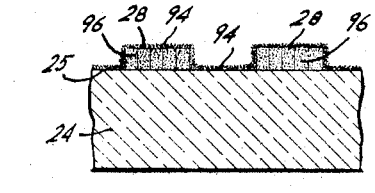

FIG. 2D.

| DRY SAID SELECTED REGIONS. | 18 |

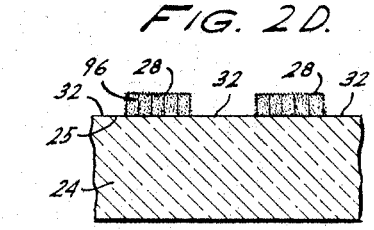

FIG. 2E.

| WASH EXCESS PHOSPHOR POWDER FROM SAID FACEPLATE AND SAID SELECTED REGIONS. | 20 |

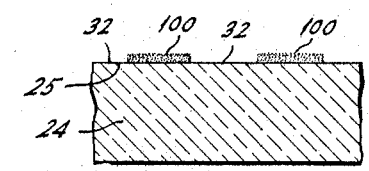

FIG. 2F.

| TAN ADDITIONALLY SAID SELECTED REGIONS | 22 |

FIG. 1.

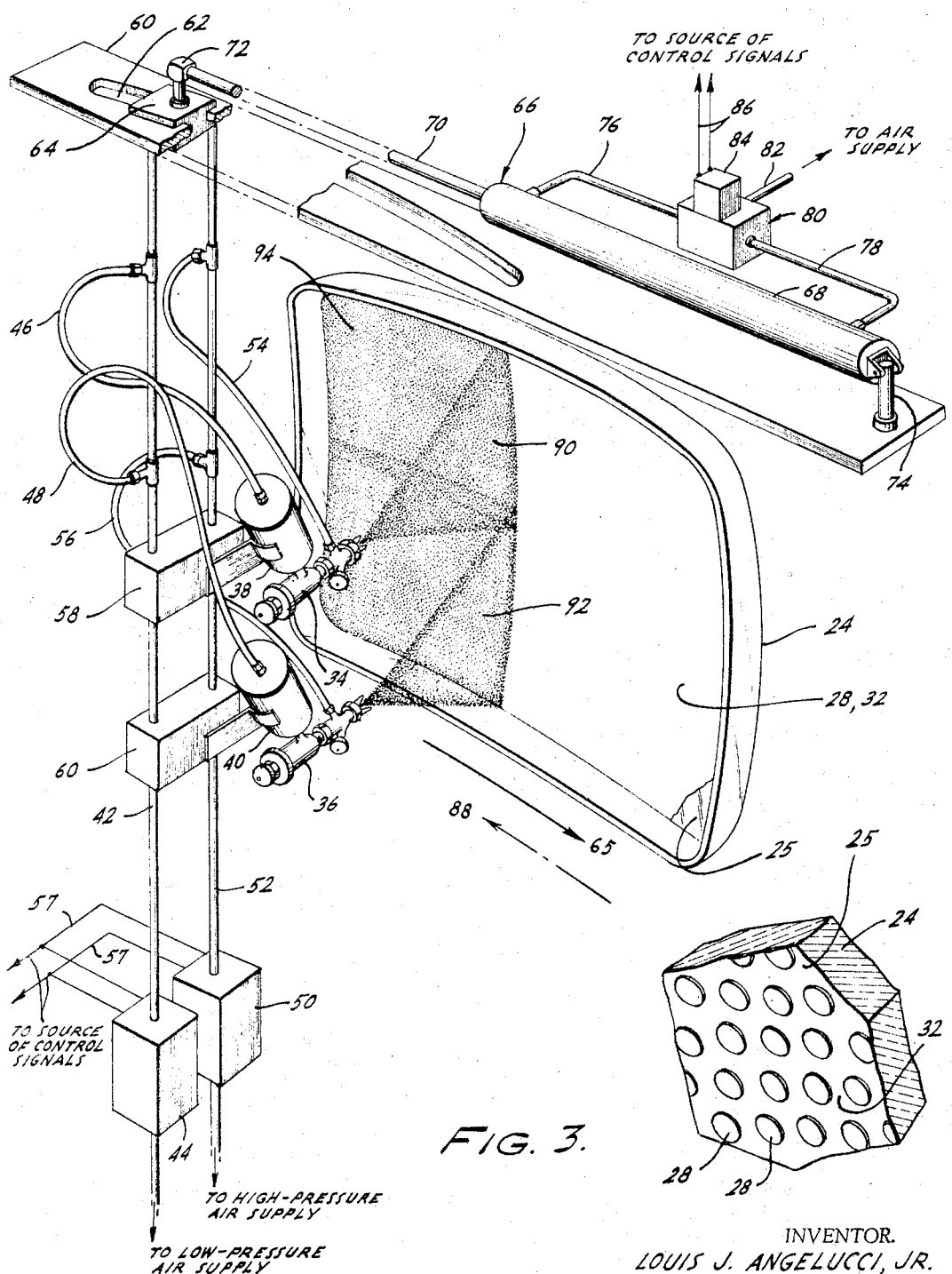

3,428,454
PROCESS FOR DEPOSITING PARTICULATE SOLID MATERIAL ON SELECTED PORTIONS OF A SUBSTRATE
Louis J. Angelucci, Jr., Norristown, Pa., assignor to Philco-Ford Corporation, a corporation of Delaware
Filed May 3, 1965, Ser. No. 452,747
U.S. Cl. 96—36.1                    10 Claims
Int. Cl. G03c 5/00; C23d 5/08

ABSTRACT OF THE DISCLOSURE

A process for depositing phosphor particles on a plurality of discrete selected portions of the faceplate of a color television picture tube, which includes the steps of forming by photographic means regions of exposed dichromated polyvinyl alcohol or similar material which, when soaked with water, are penetrable throughout their thickness by dry phosphor particles projected thereagainst with at least a given velocity, soaking said regions with water, projecting at said regions dry phosphor particles having dimensions small compared to the thickness of said regions and velocities at least as high as said given velocity, thereby to embed said phosphor particles throughout the thickness of said regions, and washing the resulting structure to remove excess phosphor particles.

Where different phosphor particles also are to be deposited on other portions of the faceplate, the process includes the additional step of tanning further the already-exposed regions, thereby to inhibit their imbibation of water and render them impervious to penetration by phosphor particles subsequently projected thereagainst.

---

This invention relates to a process for depositing particulate solid material on selected portions of a substrate, and more particularly, to a photodeposition process which is especially useful in the fabrication of luminescent screens for color television picture tubes.

The shadowmask type of color television picture tube typically comprises a light-emissive screen including a transparent glass faceplate to which are affixed phosphor dots respectively emissive of red, green and blue light when impinged by an electron beam. The phosphor dots emissive of light of each color are arranged to form a repetitive pattern on the faceplate. The shadowmask tube also comprises three electron guns directed toward the screen, and a perforated plate—the shadowmask—positioned between the three electron guns and the screen. For faithful color reproduction, the arrangement and size of the phosphor dots, the arrangement of the holes in the shadowmask, the diameter of these holes, the positioning of the shadowmask between the screen and the three electron guns, and the positioning and respective orientations of the three guns with respect to shadowmask and screen, must by such that, when the three electron beams respectively emitted by the three guns are scanned across the shadowmask, the portion of any one beam passing through holes in the shadowmask impinges only on phosphor dots emissive of light of a given color. To obtain this result in a picture tube providing high-resolution color reproduction, each phosphor dot must be correctly positioned, within close tolerances, on the faceplate of the tube, and the configuration of each dot, e.g., its diameter and circularity, must conform closely to the configuration called for by the design of the tube. To obtain from the picture tube the brightest image obtainable with the specific phosphors employed, each phosphor dot must have a high phosphor density and contain a sufficient quantity of phosphor, and substantially all of the phosphor contained in each dot must be impinged by electrons of the beam scanning that dot.

To obtain the required placement and configuration of the phosphor dots on the screen, it has been found to be desirable to deposit the dots photographically, using the shadowmask as a photographic mask to control the exposure of a light-sensitive substance on the screen.

Heretofore, it has been difficult to deposit, on the faceplate of a shadowmask tube, phosphor dots which have a high phosphor density, contain a sufficient quantity of phosphor and also are positioned precisely and conform closely to the required configuration. While one prior-art process provides dense dots, the control over the configuration of the dots is difficult. Another prior-art process provides good control of configuration, but only a relatively small amount of phosphor is deposited thereby.

More particularly, to obtain dense dots, many manufacturers have employed the so-called slurry method of photodeposition. In this method, the phosphor to be deposited is mixed with a solution of photosensitive material to form a slurry. The faceplate is coated with this slurry. Then those regions of the photosensitive coating overlying areas on the faceplate on which dots of the phosphor are to be deposited are exposed to actinic radiation through the shadowmask. Thereafter the unexposed regions of the coating are removed selectively from the faceplate by dissolving them selectively with an appropriate solvent. Phosphor dots composed of a phosphor emissive of a different color are deposited by repeating the foregoing process.

The foregoing process has several limitations. Because the photosensitive coating contains much phosphor and because the phosphor absorbs a considerable amount of the actinic radiation used to expose the coating, a relatively long exposure of the coating is required to expose the portion of the coating adjacent the faceplate sufficiently to prevent this portion from being undermined by the solvent employed to remove unexposed portions of the coating. For example, an exposure of 8 to 12 minutes may be required when the coating contains a phosphor having a white body color, and as much as 25 minutes may be required when the coating contains a phosphor having a body color other than white, e.g. orange. However such long exposures are undesirable because they slow the mass-production of tubes.

The phosphor present in the photosensitive coating also gives rise to problems in controlling precisely the diameter and configuration of dots made by the slurry process, because these phosphor particles scatter the exposing radiation as well as absorbing it. The scattered radiation exposes regions of the photosensitive coating beyond the perimeters of those areas thereon on which the exposing radiation initially impinges after passing through the holes in the shadowmask. Since a relatively long exposure is needed to expose adequately the portion of the photosensitive coating adjacent the faceplate, this "growth" of the exposed region, especially at the surface of the coating nearest the source of exposing radiation, is appreciable. Since the pattern of exposure produced by the scattered radiation cannot be predicted precisely, the configuration of the dots produced by the slurry method cannot be controlled precisely.

To make allowance for the fact that the precise configuration of the completed dots cannot be controlled, it is necessary in the slurry process to make the holes in the shadowmask through which the photosensitive coating is exposed sufficiently small to constrain the exposing radiation passing therethrough to areas of the photosensitive coating smaller than the areas which the completed phosphor dots are to have. However any reduction in the diameter of the holes of the shadowmask below the diameter required by the electron optics of the tube is undesirable because it reduces the light output of the screen and increases the heat generated in the shadowmask.

In addition, recovery of the excess phosphor removed from the faceplate during the slurry process, for reuse in subsequent performances of the process, often is impracticable because of the cost of the steps required to separate the phosphor particles from the photosensitizer and emulsion base of the slurry, with which the phosphor particles are intimately mixed.

To provide more precise control over the configuration of the dots, other phosphor deposition processes have been suggested in which a translucent photosensitive film free of phosphor is used in place of the phosphor-containing photosensitive coating, and the phosphor is applied to this film only after exposure thereof. In one such process, the phosphor is applied, immediately after exposure of the film, to a surface of the film (e.g., by dusting, settling, low-pressure spraying or in a slurry). Then the unexposed portions of the film and the phosphor adherent thereto are removed selectively. In another such process, unexposed portions of the film are removed selectively immediately after exposure of the film and before the phosphor is applied thereto. Then the phosphor is applied to the surface of the remaining, exposed portions of the film.

Because the photosensitive film used in the foregoing process contains no phosphor, much less light is absorbed and scattered within the film than in the phosphor-containing coating used in the slurry process. As a result, the time required to expose the photosensitive film is substantially shorter than in the slurry process, and the configuration of the deposited phosphor dots is much more closely controllable than in the slurry process. However to deposit an amount of phosphor comparable to that obtainable by the slurry process, it may be necessary to repeat the translucent-film photodeposition process two or more times with the same phosphor. Such a procedure is undesirable in commercial production because of the difficulties involved in obtaining precise registration of the dots applied during the repetitions of the process with the already-deposited dots, and because of the time consumed and expense entailed by such repetitions.

In short, no commercially useful process heretofore was known which affords as close control over the configuration of the deposited dots, and which also is capable of depositing dots having the density and amount of phosphor needed for maximum light output.

Accordingly the objects of my invention are as follows:

To provide an improved process for depositing particulate solid material on selected portions of a substrate;

To provide such a process in which the configuration and position of the deposited material are precisely controllable;

To provide such a process by which high densities of particulate material are depositable;

To provide such a process by which the amount of particulate material deposited is controllable;

To provide such a process in which all of the aforementioned results are achievable simultaneously;

To provide a process for depositing phosphor particles on selected portions of the faceplate of a cathode-ray tube, which process is capable of depositing said particles precisely in a given configuration and precisely on said selected portions, in the density and amount required for maximum light emission, To provide a process for depositing phosphor particles on selected portions of the faceplate of a cathode ray tube, in which excess phosphor particles may be recovered substantially in condition for reuse.

In accordance with the invention, these objects are achieved by a process for depositing particulate solid material on selected portions of a substrate, comprising the steps of depositing over each of said selected portions a layer of a composition throughout which said particulate matter can be embedded, and then embedding particles of said material throughout said layer. Typically, the substrate is the faceplate of a cathode ray tube, the composition is composed of exposed dichromated gelatin, or exposed dichromated polyvinyl alcohol, soaked throughout with a liquid which it can imbibe and in which it is substantially insoluble (e.g., water or methyl alcohol), and each layer is a dot of said composition. The particulate solid material (e.g., a phosphor) is embedded throughout said layer by projecting thereagainst particles of said material with velocities sufficient to embed said particles throughout said soaked layer. Then particles incident on portions of the substrate not covered by said layer are removed, e.g., by washing with a liquid in which said layer is substantially insoluble.

Because each layer initially contains no particles of the material to be deposited, it is depositable photographically in a precisely controlled configuration and position. In particular, each layer can be photographically configured to close tolerances by exposure of the photosensitive composition over an area having substantially the same perimeter as that of the portion of the substrate to be coated with the particulate matter. Hence, in fabricating luminescent screens of shadowmask tubes by my process, shadowmasks may be used having hole sizes determined solely by the electron optics of the tube for which the screen is being fabricated. Moreover, because a smaller proportion of the beam current flows through the shadowmask of a tube screened by my method than through the shadowmask of a tube screened by the slurry method, the shadowmask of a tube screened by my method develops less heat per unit of beam current than a tube screened by the slurry method. Therefore higher maximum beam currents can be employed in tubes screened by my method and even more of the light output of which the phosphor dots are capable can be obtained.

Moreover, the thorough soaking of each layer renders it penetrable throughout its thickness by particles projected thereagainst at substantial velocities. In addition, the amount of particles embedded in a layer is independent of the amount of particles projected against the layer, once an amount sufficient to fill the layer with particles has been projected thereagainst. Hence the amount of particles eventually adhering to the substrate, can be controlled merely by controlling the thickness of said layer, and it is unnecessary to project the particles uniformly against said layer.

Other objects and features of the invention will become apparent in the course of the following detailed description of the accompanying drawings, of which FIG. 1 is a flow diagram of a preferred embodiment of the process of the invention;

FIGS. 2A to 2F inclusive are cross sectional diagrams of an enlarged fragment of the light-emissive screen of a color television tube at various stages of its fabrication by the process of the invention;

FIG. 3 is another view of an enlarged fragment of the light-emissive screen during an intermediate stage of its fabrication by the process of the invention; and FIG. 4 is a diagrammatic illustration of apparatus for carrying out one of the steps of the process of the invention. None of the drawings is to scale.

In FIG. 1, the successive steps of a preferred embodiment of my process are designated by the even numerals 10 to 20 respectively. The additional step 22, set forth in dashed lines, is used only between successive performances of steps 10 to 20, as discussed hereinafter. In the following discussion, each of steps 10 to 22 is set forth as a heading, and then the preferred procedure for performing it is described thereunder.

(10) *Coat faceplate with layer of photo-sensitized polyvinyl alcohol (PVA)*

The layer preferably consists essentially of polyvinyl alcohol photosensitized with ammonium dichromate. A solution suitable for applying this layer may be prepared as follows:

A photosensitizer solution is prepared by dissolving about 22 grams of ammonium dichromate per 100 milliliters of deionized water. A polyvinyl alcohol solution is prepared by dissolving about 5 grams of a suitable polyvinyl alcohol in about 100 milliliters of deionized water. One suitable polyvinyl alcohol is sold by E. I. du Pont de Nemours & Co. under the trademark "Elvanol" as Grade No. 52–22. This polyvinyl alcohol is characterized by a viscosity (as determined by the Hoeppler falling-ball method) of 21 to 25 centipoises when in a four percent water solution at 20° C., and by a percentage hydrolysis of 87 to 89. The five percent solution employed in the present embodiment has a viscosity of 40 to 45 centipoises at 22° C.

The polyvinyl alcohol solution then is photosensitized by mixing thoroughly thereinto one milliliter of the sensitizer solution per 100 milliliters of the polyvinyl alcohol solution.

Then the faceplate to be coated (designated in FIGS. 2A to 2F, 3 and 4 by numeral 24) is secured to a spindle (not shown) initially oriented so that the inner surface 25 of faceplate 24 is oriented horizontally upward. With the faceplate 24 stationary, an appropriate quantity of the sensitized solution is dispensed onto the center of surface 25. Where, as shown in FIG. 3, the faceplate is approximately rectangular and has overall dimensions of about 17 inches by about 13.7 inches, about 150 milliliters of sensitized solution is employed. To remove bubbles and solids from the solution being dispensed, this solution is flowed onto surface 25 through a fine screen.

After all the sensitized solution has been flowed onto surface 25, faceplate 24 is spun at a few r.p.m. about its transverse axis (i.e., an axis perpendicular to the center of faceplate 24) and concurrently is tilted slowly from its initial horizontal orientation to an angle of 45 degrees while aspirators at the inner corners of faceplate 24 suck out excess polyvinyl alcohol solution flowing thereinto. After faceplate 24 has been spun at 45 degrees for a short time, its angular speed is increased about tenfold and concurrently it is further tilted slowly until its surface 25 is inclined slightly downward. Faceplate 24 is spun in this position at the increased speed for a few minutes, after which it is slowed gradually to a stop. Then faceplate 24 is removed from the spindle in a vertical position and is placed for several minutes, with surface 25 oriented horizontally downward, over a gentle draft of warm dry air. The dry air completes the solidification and drying of the layer of photosensitized polyvinyl alcohol formed by the preceding steps. Because photosensitized polyvinyl alcohol is unresponsive to yellow light, all of the foregoing steps safely may be carried out in an area illuminated by yellow light.

FIG. 2A illustrates diagrammatically an enlarged fragment of faceplate 24, the surface 25 of which is coated with a layer 26 of photosensitized polyvinyl alcohol. When layer 26 is applied as aforedescribed, it is translucent, free of bubbles or other inhomogeneities, and of substantially uniform thickness.

(12) *Expose selected regions of PVA layer*

Prior to exposure to actinic radiation, the polyvinyl alcohol forming layer 26 is readily soluble in water. After sufficient exposure to such radiation, it is substantially insoluble in water. To provide regions of polyvinyl alcohol overlying solely those areas of surface 25 on which phosphor emissive of light of a given color is to be deposited, said regions are selectively exposed to actinic radiation sufficiently to insolubilize them in water throughout their thickness, and then (in step 14, discussed hereinafter in detail) the unexposed regions of layer 26 are selectively dissolved from surface 25. The term "actinic radiation" as used herein means any radiation capable of producing a photochemical reaction in layer 26. Typically, this radiation is ultraviolet radiation emitted by a mercury arc lamp, e.g., a Type BH6 lamp manufactured by the General Electric Company. However radiation more energetic than ultraviolet radiation also is actinic and may be employed.

More particularly, in fabricating a shadowmask tube, the shadowmask eventually to be used in the completed picture tube conventionally is employed selectively to transmit ultraviolet radiation to those regions of layer 16 appropriately aligned with the holes in the shadowmask—i.e., those regions overlying the areas of faceplate 25 which will be impinged, in the completed tube, by only one of the three beams. In one conventional arrangement, the shadowmask is secured to the inner surface of the sides of faceplate 24 (e.g., by spring fingers which engage buttons (not shown) attached to said sides). Then the mask-faceplate assembly is rigidly secured over the output port of a lighthouse. In one conventional form, this lighthouse comprises quartz optics which are supplied with ultraviolet radiation by a mercury arc lamp and which are configured and positioned relative to the shadowmask so as to cause rays of ultraviolet light to impinge the various areas of the shadowmask at respective angles substantially the same as the angles at which (in the completed tube) one of the three electron beams will impinge these various areas. Under these conditions, the ultraviolet radiation passing through the holes in the shadowmask selectively exposes substantially only those regions of layer 26 which overlie areas of faceplate 25 impingeable by said one beam. These regions of layer 26 are exposed to the ultraviolet radiation sufficiently to render the exposed regions of layer 26 substantially insoluble in water throughout their thickness. When a Type BH6 bulb is employed as the source of radiation and is operated at 1000 volts and one ampere, the exposure typically is about 1.5 minutes. Overexposure is not a serious problem. However gross overexposure should be avoided because it tends to increase undesirably the diameters of the exposed regions.

FIG. 2B illustrates diagrammatically the condition of layer 26 after exposure. Selected regions 28 of layer 26, which have been exposed to the actinic radiation, are substantially insoluble in water throughout their thickness. Regions 30 between regions 28 remain unexposed and soluble in water.

*(14) Wash the PVA layer with water sufficiently to remove the unexposed regions and soak said selected, exposed regions of said PVA layer*

After the exposure has been completed, faceplate 24 is secured to a horizontal spindle arranged to rotate faceplate 24 about its transverse axis, i.e., with layer 26 vertical. Then faceplate 24 is rotated at about 4 to 6 r.p.m. While so rotating, layer 26 is sprayed with a fan spray of deionized water from three atomizing nozzles spaced about three inches apart and about 12 inches from layer 26. Typically each spray is fanned at an angle of about 110 degrees and each jet emits about 0.1 gallon of water per minute. The water temperature typically is 15° C. to 18° C., although this temperature is by no means critical. The fan sprays are oscillated across layer 26, for example, at a rate of 15 complete cycles per minute. The spraying is continued for about a minute. Such washing has been found sufficient to remove selectively all unexposed regions 30 from surface 25 and to soak all exposed regions 28 throughout their extent.

After unexposed regions 30 have been removed and exposed regions 28 thoroughly soaked with water, the washing is discontinued. Then the angular speed of faceplate 24 preferably is increased to between about 70 and about 75 r.p.m. for about one minute to remove droplets of water remaining between the soaked exposed dots 28. Such removal of these droplets reduces adherence of the subsequently-applied phosphor powder to the areas 32 of surface 25 bared by the removal of unexposed regions 30, and thereby minimizes cross-contamination of one phosphor by another when phosphor dots emissive of light of different colors are later deposited on portions of areas 32.

FIG. 2C illustrates diagrammatically and in enlarged cross-section the appearance of a portion of faceplate 24 after the washing step. Only exposed regions 28, now soaked thoroughly with water, remain on surface 25, which is bared at areas 32.

FIG. 3 illustrates in enlarged perspective the appearance of a portion of faceplate 24 after the washing step. FIG. 4 (discussed hereinafter in detail) illustrates, among other things, a portion of surface 25 covered with an array of dots 28 and of bared areas 32. Since the diameter of a dot 28 typically is only 17 mils, the dots have been omitted from FIG. 4 to avoid rendering it confusing.

(16) *Project dry phosphor powder against said soaked, selected regions at velocities sufficiently high to embed said powder throughout said regions*

The thorough soaking of exposed regions 28 makes it possible to embed particles of phosphor throughout their thickness by projecting such particles against regions 28 at sufficiently high velocities. In accordance with the invention, phosphor particles emissive of a given color when impinged by a cathode ray beam are embedded throughout regions 28 including the portions thereof adjacent surface 25. Preferably the embedment is achieved by projecting dry particles of phosphor from high-pressure airbrushes against surface 25 of faceplate 24.

FIG. 4 shows diagrammatically apparatus suitable for projecting dry phosphor powder against surface 25. This apparatus comprises two airbrushes 34 and 36 respectively (e.g., airbrushes of the type manufactured by the Paasche Airbrush Co. of Chicago, Ill., comprising a Carboloy fan-spray head and needle valve), means for supplying air thereto to produce two overlapping high-velocity phosphor sprays, and means for moving the airbrushes so that phosphor particles impinge the entire area of surface 25. These means are described more fully hereinafter.

The phosphor to be sprayed is contained in cans 38 and 40 secured to the respective input ports of airbrushes 34 and 36 and positioned so as to gravity-feed the dry particles of phosphor into the airbrushes. In addition, to assist the gravity-feeding of particles into the airbrushes, means are provided for supplying to cans 38 and 40 compressed air having a pressure of a few pounds per square inch (e.g., two to ten pounds per square inch). These means include a rigid pipe 42 connected to a low-pressure air supply (not shown) via a solenoid valve 44, and flexible air hoses 46 and 48 which supply the air flowing in pipe 42 to cans 38 and 40 respectively. To actuate airbrushes 34 and 36, high-pressure compressed air (e.g., air having a pressure of 60 to 70 pounds per square inch) is supplied thereto via a solenoid valve 50, a rigid pipe 52 and high-pressure air hoses 54 and 56 respectively. Solenoid valves 44 and 50 are operated by supplying appropriate electrical signals thereto via conductors 57.

Airbrushes 34 and 36 are rigidly secured to and supported by metal blocks 58 and 60, which in turn are secured to the rigid pipes 42 and 52. To enable airbrushes 34 and 36 to spray the entire surface 25 of faceplate 24, means are provided for moving the airbrushes substantially parallel to faceplate 24 along the entire length thereof. These means comprise a slide member 64 movable along a path determined by the shape of a slot 62 in a support member 60. Slot 62 is shaped so that its sides are substantially parallel to surface 25 of faceplate 24. Pipes 42 and 52 are rigidly secured to the underside of slide member 64. As a result, when slide member 64 is moved along slot 62, e.g., in the direction indicated by the solid arrow 65, the nozzles of airbrushes 34 and 36 are moved along paths parallel to surface 25 of faceplate 24.

To move slide member 64 (and hence airbrushes 34 and 36), a double-action pneumatic cylinder-piston assembly 66 is provided. Assembly 66 comprises a cylinder 68 and a piston rod 70 slidable therewithin and attached therewithin to a piston (not shown). Piston rod 70 also is attached to slide member 64 by a swivel fitting 72. The end of cylinder 68 remote from piston rod 70 is attached to support member 60 by a swivel pin 74. Assembly 66 also comprises two input pipes 76 and 78, respectively connected to opposite ends of cylinder 68. These pipes connect cylinder 68 to the outputs of a solenoid valve 80 supplied with high-pressure compressed air via a pipe 82. Valve 80 comprises a solenoid 84 actuatable from one condition to another by electrical control signals supplied to solenoid 84 via conductors 86. When solenoid 84 is in one condition, valve 80 permits compressed air from pipe 82 to flow into pipe 76 and concurrently opens pipe 78 to the atmosphere. Under these conditions, piston rod 70 is urged into cylinder 68 and slide 64 is pulled in the direction indicated by solid arrow 65. When solenoid 84 is in the other condition, valve 80 permits compressed air from pipe 82 to flow into pipe 78 and concurrently opens pipe 76 to the atmosphere. Under these conditions, piston rod 70 is urged out of cylinder 68 and slide 64 is pushed in the direction indicated by broken arrow 88.

In carrying out this step of my process, faceplate 24 is arranged so that surface 25 faces the nozzles of airbrushes 34 and 36 and is spaced six to eight inches therefrom. The airbrushes are adjusted so that, when the high-pressure compressed air is supplied to airbrushes 34 and 36, each brush produces a vertical fan-spray of phosphor having a width of about eight inches at surface 25 and a thickness thereat of about 0.75 inch. The nozzles are spaced from one another so that their sprays overlap slightly (e.g., by about 0.25 inch) at surface 25.

The dry phosphor powder to be sprayed is inserted into cans 38 and 40. When, for example, a phosphor emissive of green light is to be deposited, this phosphor powder may consist of particles of silver-activated zinc cadmium sulfide containing 40 percent by weight of cadmium. To facilitate flow of the powder through airbrushes 34 and 36, these particles preferably are between about 10 and about 15 microns in extent and are coated with a small amount of silicate (e.g., a barium silicate complex). One such phosphor is manufactured by the Sylvania Electric Co. under the designation "Green Dusting Phosphor—QGX–16–1220."

After cans 38 and 40 have been filled with phosphor powder, and slide member 64 has been positioned at the left end of slot 62, control signals are supplied to solenoid valves 44, 50 and 80. These signals condition valves 44, 50 and 80 to permit passage of compressed air to airbrushes 34 and 36 and pipe 76 and to open pipe 78 to the atmosphere. Under these conditions, piston rod 70 is actuated to urge slide 64 (and hence airbrushes 34 and 36) in the direction indicated by arrow 65. Concurrently airbrushes 34 and 36 respectively project against surface 25 of faceplate 24 high-velocity sprays 90 and 92 of dry phosphor particles. By reason of their high velocities, these particles embed themselves throughout each of the water-soaked regions 28 and also deposit on the bare regions 32 of surface 24, forming a layer 94 as shown in FIG. 2D and FIG. 4.

The spraying of dry phosphor is continued until sprays 90 and 92 have traversed the entire surface 25 of faceplate 24. The rate at which sprays 90 and 92 are moved across faceplate 24 is selected to be sufficiently slow to permit embedment in regions 28 of the maximum quantity of phosphor particles embeddable therein. This quantity depends directly on the thickness of regions 28. Typically, sprays 90 and 92 are moved across a faceplate approximately 17 inches long in four or five seconds.

When sprays 90 and 92 have traversed all of surface 25, solenoid valves 44 and 50 are actuated to shut off the supply of compressed air to airbrushes 34 and 36 and thereby end the spraying. Concurrently solenoid valve 80 is actuated to open pipe 76 to the atmosphere and supply compressed air from pipe 82 to pipe 78. Under these conditions, piston rod 70 is actuated to push slide member 64 (and hence airbrushes 34 and 36) in the direction indicated by broken arrow 88, to the left end of slot 62.

(18) *Dry said selected regions*

The dry phosphor powder embedded in regions 28 during the preceding step absorbs much of the water initially contained in said regions, and hence tends to dry the polyvinyl alcohol of which regions 28 are composed. This drying is desirable because it aids the polymerization of the polyvinyl alcohol. Such polymerization reduces the capacity of regions 28 to imbibe water and hence inhibits the washing-out from regions 28, during the subsequent washing step 20, of phosphor particles embedded in regions 28. To encourage further the polymerization of the polyvinyl alcohol of regions 28, these regions are further dried by blowing dry air against surface 28 for about three to about five minutes at a rate of about three cubic feet of air per minute.

FIG. 2D illustrates diagrammatically the appearance of a portion of faceplate 24 after the projecting step 16 and the drying step 18 have been performed. A layer 94 of phosphor particles covers the exposed surfaces of regions 28 and bared portions 32. In addition, and in accordance with the invention, phosphor particles 96 are embedded throughout all portions of each of regions 28, including the portion adjacent surface 25.

(20) *Wash excess phosphor powder from said faceplate and said selected regions*

After the dry phosphor powder has been embedded throughout regions 28, substantially all phosphor powder on areas 32 and the loosely adherent phosphor powder on the surfaces of regions 28 are removed by washing the interior of faceplate 24 with deionized water. This washing step may be performed in the same manner as washing step 14. Because the surface 25 of faceplate 24 is clean when the phosphor particles are projected thereagainst and because deionized water is used to wash the phosphor particles from faceplate 24, the phosphor particles so removed may be conditioned for reuse merely by drying them. Such recovery is economically advantageous, since much of the phosphor powder sprayed in step 16 is washed from faceplate 24 in step 20. For example, 20 grams of phosphor powder may be sprayed against faceplate 24 in step 16, and as much as 17 grams of this powder may be washed therefrom in step 20.

Moreover, although washing step 20 removes substantially all phosphor particles from bared areas 32 and many phosphor particles from the surfaces of regions 28, it removes few phosphor particles embedded within regions 28. The maximum number of particles embeddable in any given volume of a region 28 having a given thickness is approximately constant regardless of how heavily or how non-uniformly the region is sprayed. Therefore, since most of the phosphor particles ultimately adhered to faceplate 25 are those embedded within regions 28, the density and amount of this adhered phosphor are substantially independent of the quantity of phosphor sprayed on regions 28 (beyond the quantity needed to embed the maximum amount therein) and the uniformity with which it is sprayed thereon. Hence even though the overlapping portions of phosphor sprays 90 and 92 deposit a thicker layer of phosphor along the path travelled by these portions, the amount of phosphor embedded in those regions 28 lying along said path (and ultimately adhered to surface 25) is substantially the same as the amount of phosphor embedded in other regions 28.

FIG. 2E illustrates diagrammatically the appearance of a fragment of faceplate 24 after washing step 20 is performed. Bared areas 32 are substantially free of phosphor particles. Phosphor particles 96 are embedded throughout all regions 28 and a thin layer of phosphor particles adheres tenaciously to the surface thereof.

(22) *Tan additionally said selected regions*

The foregoing steps 10 to 20 deposit on faceplate 24 an array of polyvinyl alcohol dots throughout which are embedded phosphor particles emissive of light of a given color, e.g. green. Additional arrays of such dots, containing phosphor particles respectively emissive of light of different colors, e.g., of blue and red light, may be laid down on faceplate 24 by repeating steps 10 to 20 of the process for each of the different phosphors to be deposited thereon.

Before repeating steps 10 to 20 to deposit phosphor particles emissive of light of a different color, it is desirable further to polymerize the surfaces of the already-deposited regions 28. Such further polymerization further inhibits the uptake of water by regions 28 and hence renders them substantially impervious to penetration by additional phosphor particles sprayed onto surface 25 of faceplate 24. This further polymerization may be achieved as follows: The surfaces of exposed regions 28 are wetted with a 0.1 percent-by-weight aqueous solution of ammonium dichromate, e.g., by swirling the dichromate solution over surface 25 of faceplate 24. Then the excess dichromate solution is poured off, and regions 28 are air dried. In one instance, satisfactory drying was achieved by blowing 3 cubic feet per minute of dry air thereon for about 5 minutes. Then the entire surface 25 of faceplate 24 is flooded with ultraviolet radiation sufficiently to photolyze the ammonium dichromate taken up by regions 28 from the aqueous solution. This photolysis tans further the polyvinyl alcohol of regions 28.

To deposit, on appropriate regions of surface 25, polyvinyl alcohol dots in which are embedded phosphor particles emissive of blue light, steps 10 to 20 are repeated. One suitable blue-light-emissive phosphor is silver-activated zinc sulfide, the particles of which are 10 to 15 microns in extent and are coated with a silicate to make them free-flowing. One such phosphor is sold by the Sylvania Electric Co. under the designation "Blue Dusting Phosphur, QBX–16–1320." Then the newly deposited dots are tanned additionally by practicing step 22. Steps 10 to 20 again are repeated to deposit on appropriate regions of surface 25 additional polyvinyl alcohol dots in which are embedded phosphor particles emissive of red light. One suitable red-light-emissive phosphor is zinc cadmium sulfide containing 80 percent-by-weight of cadmium, the particles of which are 10 to 15 microns in extent and are coated with the silicate to make them free-flowing. One such phosphor is sold by the Sylvania Electric Co. under the designation "Zinc Cadmium Sulfide Red Dusting Powder, RX–27." Another suitable red-light-emissive phosphor is yttrium vanadate activated with europium, having a particle size of about 6 to 9 microns. One such phosphor is sold by the Sylvania Electric Co. under the designation "Rare Earth Red Dusting Phosphor, No. 1120 QRX." The polyvinyl alcohol dots having embedded therein the red-light-emissive phosphor need not be tanned further because no further phosphor is sprayed on faceplate 24. In the foregoing example, green-emissive phosphor is deposited first, followed by blue-emissive phosphor and then red-emissive phosphor. However the different phosphors may be deposited in any convenient order, and indeed, phosphors emissive of light other than red, green or blue light may be employed if desired.

The tube may be completed in conventional manner. For example, faceplate 24, now screened with three arrays of phosphor-containing polyvinyl alcohol dots, is lacquered and then aluminized in conventional manner. Then the shadowmask used in screening faceplate 24 is permanently secured thereto, and faceplate 24 is sealed to the funnel portion (not shown) of the picture tube.

After the funnel portion is attached, the polyvinyl alcohol in which the phosphor particles are embedded and the layer of lacquer underlying the aluminum layer are vaporized by pyrolysis. To pyrolyze the polyvinyl alcohol and lacquer, the assembly comprising faceplate 24 and the funnel is placed in an oven and heated therein so that the temperature of the assembly rises slowly from room temperature to about 450° C., for example, at the rate of about 8 to 10 degrees centigrade per minute. Then the assembly is maintained at a temperature of about 450° C. for about one hour, after which time it is cooled slowly to about 150° C., for example, at a rate of about two degrees centigrade per minute. FIG. 2F illustrates diagrammatically the appearance of a portion of faceplate 24 after pyrolysis of the polyvinyl alcohol and lacquer. For clarity of illustration, the aluminum layer overlying faceplate 24 is not shown. By the heating and pyrolysis, the phosphor particles initially embedded in the polyvinyl alcohol are adhered to surface 25 as phosphor dots 100.

After the pyrolysis has been completed, the assembly is removed from the oven and the three electron guns of the tube are sealed into the neck of the funnel. Then the interior of the tube is connected to a vacuum pump and the gases therewithin exhausted.

By employing my process, a variety of desirable results are achieved. The phosphor dots 100 deposited by the process can contain an amount and density of phosphor which is as great as or greater than the amount and density of phosphor in dots deposited by the slurry process. Hence, for a given beam current, beam cross-section and acceleration voltage, the phosphor dots deposited by my process can emit as much or more light than dots laid down by the slurry process, and can emit much more light than dots laid down by those prior-art processes in which the phosphor particles are adhered merely to the surface of exposed polyvinyl alcohol.

Moreover, since the amount of phosphor deposited varies directly as the thickness of polyvinyl alcohol layer 26, the amount of phosphur in dots 100 is readily variable by varying the thickness of layer 26 (see step 10). This thickness is readily controllable, for example, by varying the viscosity of the polyvinyl alcohol solution used to form layer 26. To deposit a thinner layer, the viscosity of the polyvinyl alcohol solution is reduced by decreasing the concentration of the polyvinyl alcohol in the solution, e.g., to three grams of polyvinyl alcohol per 100 milliliters of deionized water. To form a thicker layer, the viscosity of the polyvinyl alcohol solution is increased by increasing the concentration of polyvinyl alcohol therein. Preferably the concentration of polyvinyl alcohol in the solution is not increased above seven grams of polyvinyl alcohol per 100 milliliters of water when Grade No. 52–22 "Elvanol" is used, because larger amounts of this polyvinyl alcohol render the solution so viscous that it becomes difficult to deposit a uniform layer therewith. Since the amount of phosphur deposited is determined mainly by the thickness of the polyvinyl alcohol layer, any non-uniformity in the projection of the dry phosphor at the screen will not affect the finished screen provided of course that the particles always are projected with a sufficient velocity and in sufficient quantity to load thoroughly the polyvinyl alcohol dots with phosphor particles.

The process of the invention permits extremely close control of the diameters of the phosphor dots 100 laid down, because the polyvinyl alcohol layer employed is translucent and contains no particles (e.g., of phosphor) to scatter appreciably the actinic radiation used to expose it. Therefore it is feasible to use a shadowmask having holes the diameters of which are determined solely by the electron-optical design of the tube.

The foregoing detailed description has been directed specifically to a process for depositing phosphor dots on the faceplate of a cathode ray tube. However, this process also can be used more generally for depositing particulate material of whatever kind desired on selected regions of any substrate.

In the fabrication of screens for cathode-ray tubes, my process is not limited to deposition of dots, but can be used to deposit phosphors in any pattern desired. For example, the process can be used to deposit the successive parallel stripes of light-emissive material employed in Apple-type color television picture tubes and also to deposit the indexing stripes thereof. The light-emissive materials used in shadowmask type and Apple-type television picture tubes and the materials used in the indexing stripes of Apple-type television picture tubes are all electron beam responsive materials.

Considerable variation also is possible in the materials and conditions employed in practicing the process of the invention. For example, in step 10, other substances may be used to photosensitize the polyvinyl alcohol solution, such as lithium dichromate, sodium dichromate or potassium dichromate. Layer 26 need not be composed of dichromated polyvinyl alcohol, but may be composed of any other composition which (1) has a solubility in a given solvent which decreases, in response to exposure of said composition to a given radiation, by an amount directly dependent on the quantity of the given radiation incident thereon, and (2) is capable of imbibing said given solvent after being exposed to said given radiation sufficiently to reduce substantially its solubility in said given solvent. Among such compositions are the photosensitized gelatins, e.g., dichromated albumin gelatin. Where the process is used in fabricating the luminescent screen of a cathode-ray tube, the gelatin preferably should be substantially halogen-free, since halogens tend to deteriorate electron-emissive cathodes. Gelatins having a high ash content or poor definition also should be avoided in fabricating luminescent screens.

Moreover layer 26 need not be deposited by the steps specifically described hereinbefore, but alternatively may be deposited by any other step or steps producing a clear, uniform film. For example, the techniques described at column 7, line 36 to column 8, line 2 of U.S. Patent No. 2,950,193 of P. D. Payne, Jr., issued Aug. 23, 1960, may be employed to deposit layer 26. In addition, where different amounts of particulate material per unit area are to be deposited on different portions of a substrate, a photosensitive layer 26 may be employed which is thicker over those portions on which more material is to be deposited than over those portions on which less material is to be deposited.

In the foregoing description of washing steps 14 and 20, deionized water was designated as the washing liquid. While this liquid is preferred in screening cathode ray tubes because it is non-poisonous and does not contaminate the excess phosphor removed in step 20, liquids other than water in which the unexposed polyvinyl alcohol (or other photosensitive composition) is soluble and in which the exposed polyvinyl alcohol (or other photosensitive composition) is insoluble can be used in either or both of the steps designated as 14 and 20 in FIG. 1. Such liquids include lower aliphatic alcohols such as methyl alcohol and a denatured alcohol sold under the trademark "Solox" by the United States Industrial Chemicals Co.

In step 16, the specific apparatus illustrated in FIG. 4 for projecting phosphor particles against faceplate 24 need not be used. For example, the particles of phosphor may be projected against faceplate 24 from a single hand-held airbrush moved so as to spray the entire surface. As discussed hereinbefore, the spraying need not be uniform over all regions 28. Since regions 28 are capable of accepting only a fixed maximum amount of phosphor, any excess phosphor is readily removable therefrom. It is only necessary that the particles be projected against regions 28 with a velocity sufficient to embed them throughout the regions 28.

While the specific coated phosphors enumerated above are preferred because of their free-flowing characteristics, other phosphors can be used successfully in performing the process of the invention. For example, uncoated phosphors can be used successfully if those phosphors are dried thoroughly just before being placed into cans 38 and 40. Such drying can be carried out by heating the phosphor particles for several hours in an oven maintained at 100° C., and removing them from the oven just before use. Another way to obtain free flow of the phosphor particles is by thoroughly mixing therewith a very small quantity of aluminum oxide particles, e.g., approximately a teaspoonful of alumina to 100 pounds of phosphor.

While the foregoing has described what is at present considered to be the preferred embodiment of the invention, it will be apparent that various modifications and other embodiments within the scope of the invention will occur to those skilled in the art. Accordingly, it is desired that the scope of the invention be limited by the appended claims only.

I claim:

1. In a process for depositing on a plurality of discrete selected portions of a substrate particulate solid electron beam responsive material each of the particles of which has a longest rectilinear dimension not exceeding a given length, the steps, in the order recited, of:
    forming on said substrate a layer of a photo-sensitive composition, said layer having a thickness substantially greater than said given length, said composition having a solubility in a given solvent which decreases, in response to exposure of said composition to a given radiation, by an amount directly dependent on the quantity of said given radiation incident on said composition, said composition being capable of imbibing said solvent after said composition has been exposed to said given radiation sufficiently to reduce substantially its solubility in said given solvent,
    exposing to said radiation those regions of said layer overlying said selected portions, said exposure being sufficient to render said regions substantially less soluble in said given solvent than the unexposed regions of said layer.
    washing said layer with said given solvent sufficiently both to soak said exposed regions of said layer with said given solvent, thereby to render each of said exposed regions penetrable throughout its thickness by particles of said solid material projected thereagainst with at least a given velocity, and to remove selectively from said substrate the unexposed regions of said layer, thereby baring areas of said substrate, and
    embedding said particulate solid material throughout the thickness of each of said soaked exposed regions by projecting thereagainst with at least said given velocity dry particles of said solid material.

2. A process according to claim 1 comprising the additional step, performed after said projecting step, of washing said bared areas sufficiently to remove therefrom particles of said material present thereon.

3. In a process for depositing on a plurality of discrete selected portions of a substrate particulate solid electron beam responsive material each of the particles of which has a longest rectilinear dimension not exceeding a given length, the steps, in the order recited, of:
    coating said substrate with a photosensitive layer composed of dichromated polyvinyl alcohol, said layer having a thickness substantially greater than said given length,
    exposing to actinic radiation those regions of said layer overlying said selected portions of said substrate, said exposure being sufficient to render said regions substantially less soluble in water than the unexposed regions of said layer,
    washing said layer with water sufficiently both to soak said exposed regions of said layer, thereby to render each of said exposed regions penetrable throughout its thickness by particles of said solid material projected thereagainst with at least a given velocity, and to remove from said substrate the unexposed regions of said layer, thereby baring areas of said substrate,
    embedding said particulate solid material throughout the thickness of each of said soaked exposed regions by projecting thereagainst with at least said given velocity dry particles of said solid material, and
    drying said exposed regions.

4. A process according to claim 3, wherein said particulate solid material is a phosphor.

5. A process according to claim 3, wherein said washing step includes soaking each of said exposed regions throughout substantially every part thereof, and said process comprises the additional step, performed after said drying step, of washing said bared areas sufficiently to remove therefrom particles of said solid material present thereon.

6. A process according to claim 3, wherein said photosensitive layer comprises polyvinyl alcohol and a dichromate compound selected from the group consisting of ammonium dichromate, lithium dichromate, sodium dichromate and potassium dichromate.

7. A process according to claim 3, wherein said photosensitive layer comprises polyvinyl alcohol and ammonium dichromate, and said particulate solid material is a phosphor.

8. In a process for depositing, solely on a plurality of discrete selected portions of a transparent glass faceplate of a cathode-ray tube, phosphor particles each of which has a longest rectilinear dimension not exceeding a given length, the steps, in the order recited, of
    coating a surface of said faceplate with a layer of polyvinyl alcohol photosensitized with ammonium dichromate, said layer having a thickness substantially greater than said given length,
    exposing to ultraviolet radiation solely those regions of said photosensitized layer overlying said selected portions of said faceplate, said exposure being sufficient to render each of said regions substantially insoluble in water throughout its thickness,
    washing said layer with water sufficiently both to soak said exposed regions of said layer, thereby to render each of said exposed regions penetrable throughout its thickness by particles of said phosphor projected thereagainst with at least a given velocity, and to remove from said surface the unexposed regions of said layer, thereby baring portions of said surface,
    removing water present on said bared portions of said surface,
    while said exposed regions are soaked with water, projecting dry particles of said phosphor against said exposed regions, with at least said given velocity, thereby to embed particles of said phosphor throughout the thickness of each of said soaked exposed regions,
    drying said exposed regions, and
    washing with water said bared portions of said surface and said exposed regions sufficiently to remove substantially all of said phosphor particles lying on said bared portions.

9. A process according to claim 8, wherein said step of washing said layer with water comprises soaking said exposed regions throughout substantially all portions thereof.

10. A process according to claim 8, wherein the following steps are performed after said step of washing said bared portions and said exposed regions:
    applying a solution of ammonium dichromate to said exposed regions,
    drying said exposed regions,
    exposing said exposed regions to ultraviolet light,
    coating said exposed regions and said bared portions of said faceplate with another layer of polyvinyl alcohol photosensitized with ammonium dichromate, exposing to ultraviolet radiation solely those parts of said other layer which overlie portions of said faceplate on which particles of another phosphor are to be deposited, said exposure being sufficient to render each of said parts substantially insoluble in water throughout its thickness, washing said other layer with water sufficiently to soak said exposed parts of said other layer and to remove from said exposed regions and said surface of said faceplate the unexposed parts of said other layer, thereby baring areas of said surface and said exposed regions, removing water present on said bared areas, while said exposed parts are soaked with water, projecting dry particles of said other phosphor against said bared areas and said exposed parts, with velocities sufficiently high to embed said particles of said other phosphor throughout each of said exposed parts, drying said exposed parts, and washing with water said areas and said exposed parts sufficiently to remove substantially all particles of said other phosphor lying on said areas.

References Cited

UNITED STATES PATENTS

| | | | |
|---|---|---|---|
| 2,221,474 | 11/1940 | Gardner | 96—36.1 XR |
| 2,827,390 | 3/1958 | Garrigus | 96—36.1 XR |
| 2,837,429 | 6/1958 | Whiting | 96—36.1 |
| 2,940,864 | 6/1960 | Watson | 117—25 XR |
| 3,005,708 | 10/1961 | Hesse | 96—36.1 |
| 3,226,246 | 12/1965 | Vedmeulen et al. | 96—36.1 |

NORMAN G. TORCHIN, *Primary Examiner.*

C. BOWERS, *Assistant Examiner.*

U.S. Cl. X.R.

117—17.5, 25, 33.5, 63, 65.2, 104